(12) United States Patent
Hirose et al.

(10) Patent No.: US 10,388,950 B2
(45) Date of Patent: Aug. 20, 2019

(54) NEGATIVE ELECTRODE ACTIVE MATERIAL FOR NEGATIVE ELECTRODE MATERIAL OF NON-AQUEOUS ELECTROLYTE SECONDARY BATTERY, NEGATIVE ELECTRODE FOR NON-AQUEOUS ELECTROLYTE SECONDARY BATTERY, AND NON-AQUEOUS ELECTROLYTE SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 246 days.

(21) Appl. No.: 15/112,622

(22) PCT Filed: Jan. 26, 2015

(86) PCT No.: PCT/JP2015/000321
§ 371 (c)(1),
(2) Date: Jul. 19, 2016

(87) PCT Pub. No.: WO2015/118830
PCT Pub. Date: Aug. 13, 2015

(65) Prior Publication Data
US 2016/0344019 A1 Nov. 24, 2016

(30) Foreign Application Priority Data
Feb. 7, 2014 (JP) .................................. 2014-022159

(51) Int. Cl.
*H01M 4/131* (2010.01)
*H01M 4/36* (2006.01)
(Continued)

(52) U.S. Cl.
CPC ......... *H01M 4/366* (2013.01); *H01M 4/0445* (2013.01); *H01M 4/0461* (2013.01);
(Continued)

(58) Field of Classification Search
None
See application file for complete search history.

(56) References Cited

U.S. PATENT DOCUMENTS 5,395,711 A 3/1995 Tahara et al.
7,459,236 B2 12/2008 Konishiike et al.
(Continued)

FOREIGN PATENT DOCUMENTS

CN 102576908 A 7/2012
CN 102714307 A 10/2012
(Continued)

OTHER PUBLICATIONS

JP5180211—Machine translation (Year: 2013).*
(Continued)

Primary Examiner — Haroon S. Sheikh
(74) Attorney, Agent, or Firm — Oliff PLC

(57) ABSTRACT

A negative electrode active material for a negative electrode material of a non-aqueous electrolyte secondary battery, includes a silicon-based material expressed by $SiO_x$ where $0.5 \leq x \leq 1.6$ and either or both of a crystalized fluorine compound and a compound containing —$CF_2$—$CF_2$— units in at least a part of a surface layer of the negative electrode active material, the silicon-based material containing at least one of $Li_6Si_2O_7$, $Li_2Si_3O_5$, and $Li_4SiO_4$. There can be provided a negative electrode active material that can
(Continued)

increase the battery capacity and improve the cycle performance and initial charge and discharge performance when used for a lithium-ion secondary battery, as well as a lithium-ion secondary battery having a negative electrode using this negative electrode active material.

11 Claims, 2 Drawing Sheets

(51) Int. Cl.
| | |
|---|---|
| H01M 4/485 | (2010.01) |
| H01M 4/62 | (2006.01) |
| H01M 4/58 | (2010.01) |
| H01M 4/583 | (2010.01) |
| H01M 4/60 | (2006.01) |
| H01M 10/0525 | (2010.01) |
| H01M 4/04 | (2006.01) |

(52) U.S. Cl.
CPC .......... *H01M 4/131* (2013.01); *H01M 4/485* (2013.01); *H01M 4/582* (2013.01); *H01M 4/583* (2013.01); *H01M 4/5825* (2013.01); *H01M 4/602* (2013.01); *H01M 4/62* (2013.01); *H01M 4/622* (2013.01); *H01M 10/0525* (2013.01)

(56) References Cited

U.S. PATENT DOCUMENTS

| | | | |
|---|---|---|---|
| 8,377,592 B2 | 2/2013 | Jeong et al. | |
| 2004/0033419 A1* | 2/2004 | Funabiki | C01B 33/113 429/218.1 |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2011/0287313 A1 | 11/2011 | Fukuoka et al. | |
| 2012/0183842 A1 | 7/2012 | Kawasaki et al. | |
| 2013/0078490 A1 | 3/2013 | Morita et al. | |
| 2013/0078516 A1 | 3/2013 | Taniguchi et al. | |
| 2014/0110639 A1 | 4/2014 | Yamamura | |
| 2014/0170485 A1 | 6/2014 | Lee et al. | |
| 2016/0028085 A1* | 1/2016 | Kim | C01B 33/023 429/218.1 |

FOREIGN PATENT DOCUMENTS

| | | | | |
|---|---|---|---|---|
| CN | 102983313 A | 3/2013 | | |
| CN | 103022438 A | 4/2013 | | |
| EP | 3 171 432 A1 | 5/2017 | | |
| JP | 2997741 B2 | 1/2000 | | |
| JP | 2001-185127 A | 7/2001 | | |
| JP | 2002-042806 A | 2/2002 | | |
| JP | 2006-114454 A | 4/2006 | | |
| JP | 2006-164954 A | 6/2006 | | |
| JP | 2007-059213 A | 3/2007 | | |
| JP | 2007-234255 A | 9/2007 | | |
| JP | 2008-177346 A | 7/2008 | | |
| JP | 2008-251369 A | 10/2008 | | |
| JP | 2008-282819 A | 11/2008 | | |
| JP | 2009-070825 A | 4/2009 | | |
| JP | 2009-205950 A | 9/2009 | | |
| JP | 2009-212074 A | 9/2009 | | |
| JP | 2010-092830 A | 4/2010 | | |
| JP | 2011-243535 A | 12/2011 | | |
| JP | 2013-008567 A | 1/2013 | | |
| JP | 2013-069531 A | 4/2013 | | |
| JP | 5180211 | * | 4/2013 | ............ H01M 4/48 |
| JP | 2013-251097 A | 12/2013 | | |
| JP | 2014-044899 A | 3/2014 | | |
| KR | 20130045212 A | * | 5/2013 | ............ H01M 4/139 |
| WO | 2013/054481 A1 | 4/2013 | | |
| WO | 2013/062313 A1 | 5/2013 | | |

OTHER PUBLICATIONS

Garcia et al. "Bis(trifluoromethyl)dicarbonate, CF3OC(O)OC(O)OCF3", Journal of Flourine Chemistry, vol. 126, pp. 984-990, 2005.
Aug. 28, 2017 Extended European Search Report issued in European Patent Application No. 15746703.3.
Oct. 18, 2016 Office Action issued in Japanese Patent Application No. 2014-022159.
Apr. 10, 2018 Official Communication issued in European Application No. 15 746 703.6.
Mar. 3, 2015 International Search Report issued in International Patent Application No. PCT/JP2015/000321.
Aug. 9, 2016 International Preliminary Report on Patentability issued in International Patent Application No. PCT/JP2015/000321.
Oct. 24, 2018 Office Action issued in Chinese Application No. 201580007499.1.
Apr. 4, 2018 Office Action issued in Chinese Patent Application No. 201580007499.1.

* cited by examiner

NEGATIVE ELECTRODE ACTIVE MATERIAL FOR NEGATIVE ELECTRODE MATERIAL OF NON-AQUEOUS ELECTROLYTE SECONDARY BATTERY, NEGATIVE ELECTRODE FOR NON-AQUEOUS ELECTROLYTE SECONDARY BATTERY, AND NON-AQUEOUS ELECTROLYTE SECONDARY BATTERY

TECHNICAL FIELD

The present invention relates to a negative electrode active material for a negative electrode material of a non-aqueous electrolyte secondary battery, a negative electrode for a non-aqueous electrolyte secondary battery, and a non-aqueous electrolyte secondary battery.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density.

These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

The negative electrode active material, which is usually made of a carbon material, is required to further improve the battery capacity for recent market requirement.

Use of silicon as a negative electrode active material is considered to improve the battery capacity, for silicon has a logical capacity (4199 mAh/g) ten times larger than does graphite (372 mAh/g). Such a material is thus expected to significantly improve the battery capacity.

The development of silicon materials for use as negative electrode active materials includes not only silicon as a simple but also alloy thereof and a compound thereof such as typically oxides.

The consideration of active material shapes for carbon materials ranges from a standard application type to an integrated type in which the materials are directly accumulated on a current collector.

Use of silicon as a main material of a negative electrode active material, however, expands or shrinks the negative electrode active material when charging or discharging, thereby making the negative electrode active material easy to break particularly near its surface layer. In addition, this active material produces ionic substances in its interior and is thus easy to break.

The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example).

Moreover, a carbon material, an electronic conduction material, is disposed on the surface of silicon oxide particles so that higher battery capacity and greater safety are achieved (See Patent Document 2, for example).

Moreover, an active material including silicon and oxygen is produced to form an active material layer having a higher ratio of oxygen near a current collector so that improved cycle performance and higher input-output performance are achieved (See Patent Document 3, for example).

Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 6, for example).

Moreover, a mole ratio of oxygen to silicon in a negative electrode active material is adjusted in the range from 0.1 to 0.2 so as to hold a difference between the maximum and the minimum of the mole ratio near the interface between the active material and a current collector at 0.4 or less, so that improved cycle performance is achieved (See Patent Document 7, for example).

Moreover, a metal oxide containing lithium is used to improve the battery load characteristic (See Patent Document 8, for example).

Moreover, a hydrophobic layer such as a silane compound is formed in the surface layer of a silicon material so that improved cycle performance is achieved (See Patent Document 9, for example).

Moreover, a silicon oxide is used and coated with graphite to give conductivity so that improved cycle performance is achieved (See Patent Document 10, for example). Patent Document 10 describes that a shift value of the graphite coating, which is obtained from a Raman spectrum, has broad peaks at 1330 $cm^{-1}$ and 1580 $cm^{-1}$ and a ratio $I_{1330}/I_{1580}$ of its intensity shows $1.5 < I_{1330}/I_{1580} < 3$.

Moreover, a particle having an Si-microcrystal phase dispersing in a silicon dioxide is used to achieve higher battery capacity and improved cycle performance (See Patent Document 11, for example).

Moreover, a silicon oxide having a silicon-to-oxygen atomicity ratio of 1:y ($0<y<2$) is used to improve overcharge and overdischarge performance (See Patent Document 12, for example).

Finally, a mixed electrode containing silicon and carbon with a silicon content of 5 wt % to 13 wt % is produced to achieve higher battery capacity and improved cycle performance (See Patent Document 13, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741
Patent Document 13: Japanese Unexamined Patent publication (Kokai) No. 2010-092830

SUMMARY OF INVENTION

Technical Problem

As described previously, small electronic devices, represented by mobile terminals, have been developed to improve their performance and increase their functions. Lithium-ion secondary batteries, which are used as main sources of the devices, have been required to increase the battery capacity.

The development of lithium-ion secondary batteries including negative electrodes mainly using silicon materials have been desired to solve this problem.

The lithium-ion secondary batteries using silicon materials need the same cycle performance as lithium-ion secondary batteries using carbon materials.

However, no one has yet proposed a negative electrode active material for this type of batteries that have the same cycle stability as the lithium-ion secondary batteries using carbon materials.

The present invention was accomplished in view of the above problems, and an object thereof is to provide a negative electrode active material that can increase the battery capacity and improve the cycle performance and initial charge and discharge performance when used for a lithium-ion secondary battery, as well as a lithium-ion secondary battery having a negative electrode using this negative electrode active material.

Solution to Problem

To achieve this object, the present invention provides a negative electrode active material for a negative electrode material of a non-aqueous electrolyte secondary battery, comprising a silicon-based material expressed by $SiO_x$ where $0.5 \leq x \leq 1.6$ and either or both of a crystalized fluorine compound and a compound containing $-CF_2-CF_2-$ units in at least a part of a surface layer of the negative electrode active material, the silicon-based material containing at least one of $Li_6Si_2O_7$, $Li_2Si_3O_5$, and $Li_4SiO_4$.

This negative electrode active material, which contains the silicon-based material and further contains the aforementioned compound in the surface layer, enables a non-aqueous electrolyte secondary battery using this negative electrode active material to have high battery capacity and good cycle performance and initial charge and discharge performance.

The crystalized fluorine compound is preferably bis(trifluoromethyl)dicarbonate.

Such a crystalized fluorine compound can be suitably used in the present invention.

The fluorine compound containing $-CF_2-CF_2-$ units is preferably one or more compounds selected from the group consisting of polytetrafluoroethylene, polyhexafluoropropylene, and polyperfluorokerosene.

Such a compound containing $-CF_2-CF_2-$ units can be suitably used in the present invention.

The negative electrode active material preferably at least partially contains $SiO_2$ having a tridymite structure.

The negative electrode active material that contains $SiO_2$ having such a structure inhibits breakage of the negative electrode active material itself, enabling good cycle performance and initial charge and discharge performance.

A surface layer portion of the silicon-based material is preferably coated with at least one of carbon, lithium carbonate, and fluorinated lithium.

The silicon-based material coated with such substances exhibits better cycle performance and initial charge and discharge performance.

A surface layer portion of the silicon-based material preferably exhibits at least one of $O_2SiF^-$ and $OSiF^-$ when subjected to Time-of-Flight Secondary Ion Mass Spectrometry.

Such a silicon-based material reduces the electrolyte reaction on its surface layer, enabling better cycle performance.

A surface layer of the silicon-based material preferably has a layered structure in which the silicon-based material is coated with a carbon-based material, at least one of the lithium carbonate and fluorinated lithium, and at least one of bis(trifluoromethyl)dicarbonate and the fluorine compound containing $-CF_2-CF_2-$ units in this order.

This structure yields better cycle performance and initial charge and discharge performance.

The negative electrode active material preferably satisfies $A/B \geq 0.8$ where A is a peak intensity of an Si region represented by a chemical shift value of $-60$ ppm to $-100$ ppm and B is a peak intensity of an $SiO_2$ region represented by a chemical shift value of $-100$ ppm to $-150$ ppm, the chemical shift value being obtained from a $^{29}Si$-MAS-NMR spectrum.

The negative electrode active material having the above peak intensity ratio exhibits still better initial charge and discharge performance.

The negative electrode active material preferably exhibits a diffraction peak having a half width $(2\theta)$ of $1.2°$ or more, the diffraction peak being attributable to an $Si(111)$ crystal face and obtained by X-ray diffraction, and a crystallite size attributable to the $Si(111)$ crystal face is 7.5 nm or less.

Such a negative electrode active material enables easy formation of a stable lithium compound without degrading the battery performances.

Furthermore, the present invention provides a negative electrode for a non-aqueous electrolyte secondary battery, comprising the inventive negative electrode active material.

Such a negative electrode containing the negative electrode active material has high capacity and good cycle performance and initial charge and discharge performance.

The negative electrode preferably comprises a carbon-based active material and a silicon-based active material with a silicon-based active material content of 6 wt % or more with respect to whole negative electrode active materials.

Such a negative electrode can provide a non-aqueous electrolyte secondary battery having higher volume energy density than ever.

Furthermore, the present invention provides a non-aqueous electrolyte secondary battery comprising the above negative electrode.

The non-aqueous electrolyte secondary battery using this negative electrode has high capacity and good cycle performance and initial charge and discharge performance.

Advantageous Effects of Invention

As described previously, the inventive negative electrode active material enables a non-aqueous electrolyte secondary battery using this material to have high capacity and good cycle performance and initial charge and discharge performance.

DESCRIPTION OF EMBODIMENTS

Hereinafter, embodiments of the present invention will be described in detail with reference to the drawings, but the present invention is not limited thereto.

As described previously, use of a negative electrode mainly made of a silicon material, for use in a lithium-ion secondary battery, has been considered to increase the capacity of the lithium-ion secondary battery.

The lithium-ion secondary battery using a silicon material is required to have the same cycle performance as a lithium-ion secondary battery using a carbon material; however, no one has yet proposed a negative electrode active material for this type of battery having the same cycle stability as a lithium-ion secondary battery using a carbon material.

In view of this, the present inventors diligently conducted study on a negative electrode active material that allows a lithium-ion secondary battery using a negative electrode containing this material to have good cycle performance.

As a result, they have invented a negative electrode active material that includes $SiO_x$ ($0.5 \leq x \leq 1.6$) containing at least one of $Li_6Si_2O_7$, $Li_2Si_3O_5$, and $Li_4SiO_4$ and further includes either or both of a crystalized fluorine compound and a compound containing —$CF_2$—$CF_2$— units in at least a part of the surface layer, which enables a lithium-ion secondary battery using this material to have good cycle performance and initial charge and discharge performance. The present invention was thereby brought to completion.

<Negative Electrode for Lithium-Ion Secondary Battery>

First, a negative electrode, for use in a lithium-ion secondary battery, containing the inventive negative electrode active material for a negative electrode material of a non-aqueous electrolyte secondary battery will be described.

Figure 1:
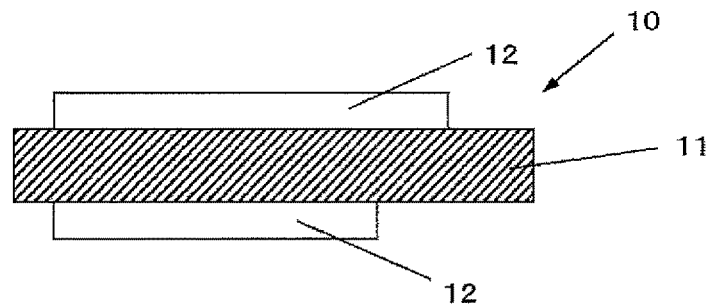
FIG. 1 is a cross-sectional view showing an exemplary configuration of a lithium-ion secondary battery containing the inventive negative electrode active material.

FIG. 1 is a cross-sectional view of a configuration of a negative electrode for a lithium-ion secondary battery (referred to as a "negative electrode" below) according to an embodiment of the invention.

[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in the inventive negative electrode using the negative electrode active materials.

[Negative Electrode Current Collector]

The negative electrode current collector 11 is made of a highly conductive and mechanically strong material. Examples of the conductive material include copper (Cu) and nickel (Ni). Such conductive materials preferably have inability to form an intermetallic compound with lithium (Li).

The negative electrode current collector 11 preferably contains carbon (C) and sulfur (S) besides the main element.

The reason is that these elements improve the physical strength of the current collector.

In particular, when the active material layer contains a material expandable at charging, such a current collector can inhibit deformation of the electrodes and the current collector itself.

The amount of the contained elements is preferably, but not particularly limited to, 100 ppm or less. This amount enables effective inhibition of the deformation.

The surface of the negative electrode current collector may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer contains particulate negative electrode materials that can occlude and emit lithium ions and may further contain other materials such as a negative electrode binder or a conductive additive depending on battery design.

The inventive negative electrode active material includes a core that can occlude and emit lithium ions, and either or both of a crystalized fluorine compound and a compound containing —$CF_2$—$CF_2$— units in at least a part of the surface layer. Additionally, the negative electrode active material may be at least partially coated with a conductive coating such as carbon and lithium carbonate. The coating portion is effective in either form of an island form or a film form.

The negative electrode active material particle may be composed of, for example, the core that can occlude and emit lithium ions, a carbon coating portion that provides conductivity, a fluorine compound and lithium carbonate that have an effect of inhibiting the decomposition reaction of an electrolyte, and a fluorine compound portion that has high water resistance. In this case, lithium ions may be occluded and emitted also in at least a part of the carbon coating portion.

The inventive negative electrode active material contains a silicon-based material ($SiO_x$, where $0.5 \leq x \leq 1.6$); a preferable composition of the silicon-based material is that x is close to 1. The more the x-value approximates to 1, the better the cycle performance is. The present invention does not necessarily intend a silicon-based material composition of 100% but permits a silicon-based material containing a minute amount of impurities.

The silicon-based material in the negative electrode materials preferably satisfies $A/B \geq 0.8$ where A is a peak intensity of an Si region represented by a chemical shift value of $-60$ ppm to $-100$ ppm and B is a peak intensity of an $SiO_2$ region represented by a chemical shift value of $-100$ ppm to $-150$ ppm, as obtained from a $^{29}$Si-MAS-NMR spectrum.

This ratio enables stable battery performances.

$^{29}$Li-MAS-NMR spectrum may be measured, for example, by an apparatus, 700-NMR spectroscope made by Bruker Corp., with a probe of 50 μL of a 4-mm-HR-MAS rotor, at a sample rotation speed of 10 kHz and a temperature of measurement environment of 25° C.

In the present invention, a part of $SiO_2$ components produced within the silicon oxide of the silicon-based material is selectively modified into a lithium compound.

As the lithium compound, at least one of $Li_6Si_2O_7$, $Li_2Si_3O_5$, and $Li_4SiO_4$ is selected. These lithium compounds exhibit particularly good battery performances. The selective compound (lithium compound) may be produced by an electrochemical method. In the electrochemical method, the selective compound can be produced by changing conditions such as voltage control and current control relative to a lithium counter electrode.

The selective compound partially produced by the electrochemical method may be dried under a carbon dioxide atmosphere or an oxygen atmosphere. This yields a dense substance.

Moreover, LiF and $Li_2CO_3$ may be formed on the particle surface by an electrochemical method to inhibit an electrolyte from decomposing with charging and discharging of the battery.

These lithium compounds can be quantified by XPS and NMR as mentioned above. For example, XPS may be measured by an apparatus, X-ray photoelectron spectroscope, with an X-ray source of a monochromatic Al-kα ray having an X-ray spot diameter of 100 μm, under an Ar-ion sputtering gun condition of 0.5 kV/2 mm×2 mm.

In the present invention, the negative electrode active material preferably at least partially contains $SiO_2$ having a tridymite structure. This structure can be obtained by controlling temperature of a deposited plate for a $SiO_x$ material, rate, and reaction temperature when a carbon layer is deposited.

When $SiO_2$ contained in the negative electrode active material has a tridymite structure, breakage of the negative electrode active material with charging can be prevented.

As described previously, the present invention is characterized in that the surface layer of the silicon-based material contains either or both of a crystalized fluorine compound and a compound containing —$CF_2$—$CF_2$— units. The crystalized fluorine compound is preferably bis(trifluoromethyl)dicarbonate.

The crystallization of a fluorine compound dramatically improves the water resistance. Thus, slurry containing such a compound hardly causes gelation, enabling the lithium compound in the bulk to keep stable.

The compound containing —$CF_2$—$CF_2$— units is preferably one or more compounds containing a $CF_2$=$CF_2$ bond selected from polytetrafluoroethylene, polyhexafluoropropylene, and polyperfluorokerosene, which are polymers of tetrafluoroethylene, hexafluoropropylene, and perfluorokerosene, respectively.

These compounds also have high water resistance, and thus slurry containing these compounds hardly causes gelation, enabling the lithium compound in the bulk to keep stable.

Both the crystalized fluorine compound and the compound containing —$CF_2$—$CF_2$— units can coat the silicon-based material by immersing powder of the silicon-based material in a solvent in which these compounds are dissolved, followed by drying.

Figure 4:
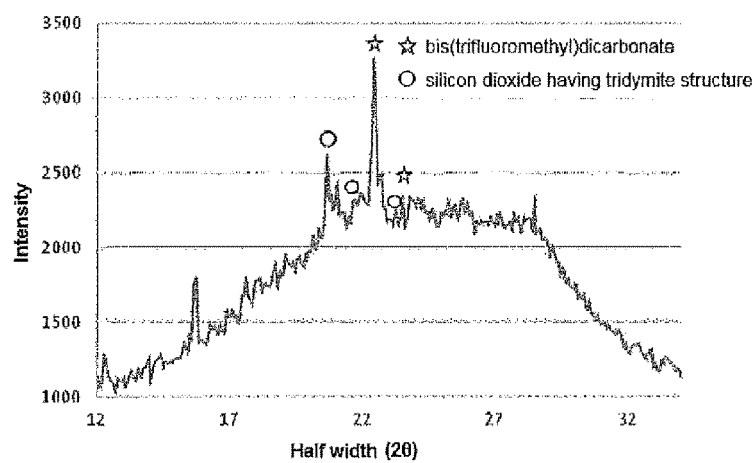
FIG. 4 is a diagram of X-ray diffraction (XRD) showing bis(trifluoromethyl)dicarbonate deposited on the surface layer of the negative electrode active material particle and silicon dioxide having a tridymite structure.

FIG. 4 is a diagram showing diffraction peaks and half widths of bis(trifluoromethyl)dicarbonate deposited on the surface layer of the negative electrode active material and silicon dioxide having a tridymite structure, obtained by X-ray diffraction (XRD).

The silicon dioxide having a tridymite structure and bis(trifluoromethyl)dicarbonate can be detected in a spectrum measured by XRD.

The present invention enables reduction or prevention of the lithium compound formation in an Si region, stabilizing the negative electrode active material in the air, water slurry, or solvent slurry.

Moreover, this negative electrode active material is more stable than those produced by thermal modification, in which the compound is randomly modified.

Moreover, in the present invention, the surface layer portion of the silicon-based material is preferably coated with at least one of carbon, lithium carbonate, and fluorinated lithium.

Such a material particularly improves the battery initial efficiency as well as long-term storage stability of the silicon-based material. The carbon layer facilitates electrical continuity between the active materials and thus can improve the battery performances.

The surface layer portion of the silicon-based material preferably exhibits at least one of $O_2SiF^-$ and $OSiF^-$.

This reduces the electrolyte reaction particularly on the surface layer, resulting in good cycle performance.

The surface layer of the silicon-based material preferably has a layered structure in which the silicon-based material is coated with a carbon-based material, at least one of lithium carbonate and fluorinated lithium, and at least one of bis(trifluoromethyl)dicarbonate and the fluorine compound containing —$CF_2$—$CF_2$— units in this order.

This structure enables better cycle performance and initial charge and discharge performance.

A lower crystallinity of the material other than the fluorine compound in the surface layer of the negative electrode active material is better. More specifically, the material preferably exhibits a diffraction peak having a half width (2θ) of 1.2° or more that is attributable to an Si(111) crystal face and obtained by X-ray diffraction, and a crystallite size attributable to the crystal face is 7.5 nm or less.

Use of the negative electrode active material with a few Si crystal enables easy production of a stable lithium compound without degrading the battery performances.

The median size of the negative electrode active material preferably ranges from 0.5 µm to 20 µm, but not particularly limited thereto.

This range makes it easy to occlude and emit lithium ions and inhibits the breakage of the negative electrode active particles at charging and discharging. A particle size of 0.5 µm or more then prevents the particle surface from increasing and thus prevents the battery irreversible capacity from increasing; a median size of 20 µm or less inhibits the breakage of the particles and the creation of a new surface.

If the silicon-based material is coated with a carbon material, this carbon coating portion preferably has an average thickness of 1 nm to 5000 nm, although not particularly limited thereto.

This range of average thickness enables improvement in electrical conductivity, thus preventing degradation of the battery performances and reduction in the battery capacity.

The average thickness of the carbon coating portion is calculated in the following manner. First, the negative electrode active material is observed by a transmission electron microscope (TEM) with an appropriate magnification. The magnification is preferably such that the thickness can be visually checked and measured. Then, the thickness of the carbon coating portion is measured at 15 arbitrary points. At this time, the measurement points are preferably distributed at random as widely as possible without concentrating in a certain area. Finally, an average value is calculated form the measurement results.

The coverage of the carbon material is preferably as high as possible although there is no particular limitation. Especially when the coverage is 30% or more, the electrical conductivity is appropriate.

The coating method with the carbon material is preferably, but not particularly limited to, sugar carbonization or pyrolysis of hydrocarbon gas, for these methods can improve the coverage.

The negative electrode binder may be, for example, one or more of a polymer material and a synthetic rubber. Examples of the polymer material include polyvinylidene fluoride, polyimide, polyamideimide, aramid, polyacrylic acid, lithium polyacrylate, and carboxymethyl cellulose. Examples of the synthetic rubber include a styrene-butadiene rubber, a fluorinated rubber, and an ethylene-propylene-diene.

Examples of the negative electrode conductive additive include carbon materials such as carbon black, acetylene black, graphite, ketjen black, carbon nanotube, carbon nanofiber, and the combination thereof.

The negative electrode active material layer 12 to be formed may include a carbon material. Such a negative electrode active material layer 12 can reduce its electrical resistance and a stress due to its expansion at charging. Examples of the carbon material include pyrolytic carbons, cokes, glassy carbon fiber, a fired organic polymeric compound, and carbon black.

The negative electrode active material layer 12 is formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode]

The negative electrode can be produced by, for example, the following procedure.

A raw material capable of generating a silicon oxide gas is heated under an inert gas atmosphere or a reduced pressure at a temperature ranging from 900° C. to 1600° C. to produce the silicon oxide gas.

The raw material is a mixture of metallic silicon powder and silicon dioxide powder. The mole ratio of the mixture preferably satisfies the relation of 0.8<(metallic silicon powder)/(silicon dioxide powder)<1.3, in consideration of the existence of oxygen on the metallic silicon powder surface and a minute amount of oxygen in a reactor.

The Si-crystallites in the particles are controlled by adjustment of an arrangement range and a vaporization temperature, or heat treatment after the production.

The produced gas is deposited on an adsorption plate. The temperature in the reactor is decreased to 100° C. or less and then a deposit is taken out. The deposit is pulverized with a ball mill or a jet mill to form powder.

Thermal CVD is desirably used to coat the obtained powder material with the carbon layer. This thermal CVD is to fill a furnace in which the silicon oxide powder is placed with a hydrocarbon gas and heat the interior of the furnace.

The pyrolysis temperature is preferably, but not particularly limited to, 1200° C. or less, more preferably 950° C. or less. This temperature range enables the inhibition of an unintended disproportionation of the active material particles.

The hydrocarbon gas preferably has a composition of $C_nH_m$ where 3≥n, though not particularly limited thereto.

This composition enables reduction in production cost and improvement in physical properties of a pyrolysis product.

The bulk modification is preferably performed by inserting lithium in the electrochemical manner. The substance produced in the bulk can be controlled by adjusting insertion potential and extraction potential or changing current density, bath temperature, and the number of insertion and extraction.

Figure 2:
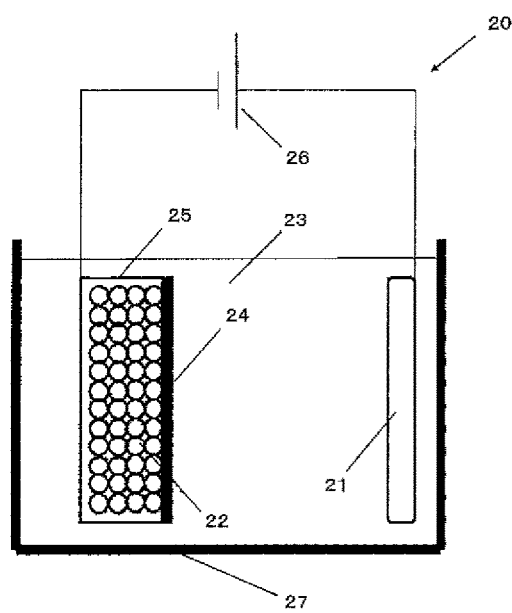
FIG. 2 shows a bulk modification apparatus used in production of the inventive negative electrode active material.

Although apparatus structure is not particularly limited, an apparatus shown in FIG. 2 may be used.

The bulk modification apparatus 20 includes a bath 27 filled with an organic solvent 23, a positive electrode 21 (lithium source) provided within the bath 27 and connected to one terminal of a power source 26, a powder storage container 25, provided within the bath 27 and connected to the other terminal of the power source 26, for storing silicon oxide powder 22, and a separator 24 provided between the positive electrode 21 and the powder storage container 25.

The modified active material is then preferably dried under a carbon dioxide atmosphere, fluorine atmosphere, or hydrogen atmosphere. This enables the material to have good bulk composition. The temperature in this operation is preferably, but not particularly limited to, 800° C. or less. This temperature can inhibit disproportionation of the particles.

In the bulk modification treatment, a fluorine compound is preferably formed by changing potential and temperature conditions. This yields a dense film.

Especially when fluorinated lithium is formed, it is preferable to keep the temperature at 45° C. or higher during insertion and extraction of lithium.

The modified particles thus obtained may contain no carbon layer. However, when more uniform control is required in the bulk modification treatment, electrical potential distribution needs to be reduced, and thus the carbon layer is desirably contained.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate.

Examples of electrolyte salt contained in the organic solvent 23 include lithium hexafluorophosphate ($LiPF_6$) and lithium tetrafluoroborate ($LiBF_4$).

The positive electrode 21 may use a lithium foil or a Li-containing compound. Examples of the Li-containing compound include lithium carbonate, lithium oxide, olivine iron lithium, lithium cobaltate, lithium nickelate, and lithium vanadium phosphate.

Subsequently, the negative electrode active material particles are mixed with the negative electrode binder and other materials such as conductive additives. The resultant negative electrode mixture is then mixed with an organic solvent, water or the like to form slurry.

The negative electrode mixture slurry is then applied to the surface of the negative electrode current collector 11 and dried to form a negative electrode active material layer 12. At this time, heating press may be performed, if necessary.

The aforementioned negative electrode, in which the $SiO_2$ component in the bulk is modified into a stable lithium compound, can improve the battery initial efficiency and stability of the active material according to cycle performance.

The negative electrode active material preferably satisfies A/B≥0.8 where A is a peak intensity of an Si region represented by a chemical shift value of −60 ppm to −100 ppm and B is a peak intensity of an $SiO_2$ region represented by a chemical shift value of −100 ppm to −150 ppm, as obtained from a $^{29}$Si-MAS-NMR spectrum. In this case, higher effect can be achieved by forming lithium silicate and lithium carbonate in the bulk or on the surface.

Moreover, a carbon material coating the negative electrode active material particle makes the compound condition in the bulk more uniform, and a fluorine compound and lithium carbonate in the surface layer improves stability of the active material, resulting in more effective negative electrode active material.

Furthermore, a water resistance layer may be formed in the surface layer after the bulk modification or during the bulk modification.

This layer prevents the slurry from gelating, keeping the lithium compound in the bulk stable.

The water resistance layer is preferably, but not particularly limited to, a fluorine compound. In particular, polytetrafluoroethylene, polyhexafluoropropylene, polyperfluorokerosene, and bis(trifluoromethyl)dicarbonate make the lithium compound in the bulk stable.

The surface layer of the silicon-based material of the negative electrode active material preferably exhibits at least one of $O_2SiF^-$ and $OSiF^-$. Such a negative electrode active material reduces the electrolyte reaction particularly on the surface layer, resulting in good battery performances.

A negative ion mass spectrum can be measured, for example, Time-of-Flight Secondary Ion Mass Spectrometry (TOF-SIMS).

A measurement apparatus may be, for example, PHI TRIFT 2 made by ULVAC-PHI Inc. The measurement can be performed, for example, under the following conditions: a primary ion source of Ga; a sample temperature of 25° C.; an accelerating voltage of 5 kV; a spot size of 100 μm×100 μm; a sputter of Ga, with 100 μm×100 μm; 10 seconds.

Figure 5:
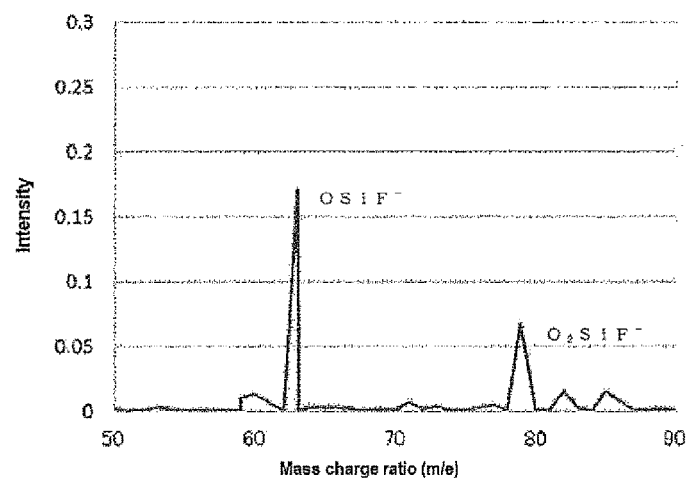
FIG. 5 is a diagram showing a negative ion mass spectrum in the surface layer of the negative electrode active material particle.

FIG. 5 shows a negative ion mass spectrum in the surface layer of the negative electrode active material particle, measured by the above apparatus and conditions. As shown in FIG. 5, when the surface layer of the silicon-based material particle exhibits $O_2SiF^-$ and $OSiF^-$ when subjected to TOF-SIMIS, each negative ion mass spectrum can be detected at a certain mass charge ratio (m/e).

The crystallinity of the material other than the fluorine compound in the surface layer of the negative electrode active material can be determined by the half width (2θ) and the crystallite size attributable to an Si(111) crystal face.

In particular, the material preferably has a low crystallinity with a half width (2θ) of 1.2° or more and a crystallite size of 7.5 nm or less. Such a material can improve the battery performances.

The material other than the fluorine compound in the surface layer of the negative electrode active material is preferably substantially amorphous. Such a material contains less Si-crystal nuclei, providing better battery performances.

Moreover, when the negative electrode current collector 11 contains carbon and sulfur in an amount of 90 ppm or less, still better battery performances can be achieved.

The negative electrode preferably contains a carbon-based active material and a silicon-based active material with a silicon-based active material content of 6 wt % or more with respect to whole negative electrode active materials.

Such a negative electrode can improve volume energy density (Wh/l) of a battery.

<Lithium-Ion Secondary Battery>

Then, a lithium-ion secondary battery using the above negative electrode will be described with reference to FIG. 3.

[Configuration of Laminate Film Secondary Battery]

Figure 3:
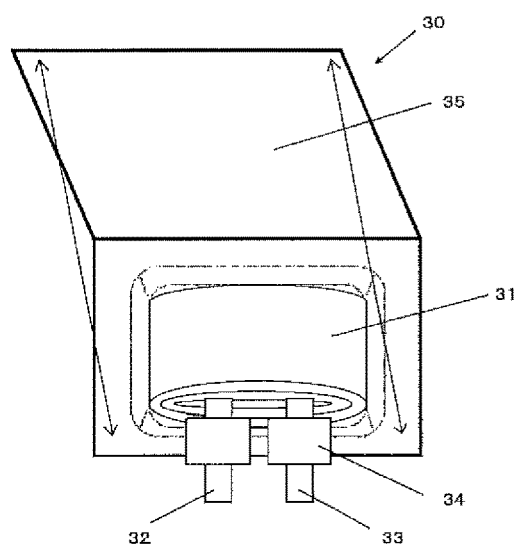
FIG. 3 is a diagram showing an exemplary configuration of a lithium secondary battery of laminate film type containing the inventive negative electrode active material.

The laminate film secondary battery 30 shown in FIG. 3 includes a wound electrode body 31 interposed between sheet-shaped outer parts 35. The wound electrode body is formed by winding a positive electrode, a negative electrode, and a separator disposed between these electrodes. The electrode body may also be composed of a laminated part of the positive and negative electrodes, and a separator disposed between these electrodes.

The electrode bodies of both types have a positive-electrode lead 32 attached to the positive electrode and a negative-electrode lead 33 attached to the negative electrode. The outermost circumference of the electrode body is protected by a protecting tape.

The positive-electrode lead and the negative-electrode lead, for example, extend from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31.

The fusion-bond layer may be, for example, a film such as a polyethylene or polypropylene film; the metallic layer aluminum foil; the protecting layer nylon.

The space between the outer parts 35 and the positive and negative electrodes 32, 33 is filled with close adhesion films 34 to prevent air from entering therein. Exemplary materials of the close adhesion films include polyethylene, polypropylene, and polyolefin.

[Positive Electrode]

The positive electrode has a positive electrode active material layer disposed on one side or both sides of a positive electrode current collector as in the negative electrode 10, for example, shown in FIG. 1.

The positive electrode current collector is made of, for example, a conductive material such as aluminum.

The positive electrode active material layer contains a positive electrode material that can occlude and emit lithium ions or the combination thereof, and may contain a binder, a conductive additive, a dispersing agent, or other materials according to design. The same detailed description as described for the negative electrode binders and negative electrode conductive additive, for example, is then given for this binder and this conductive additive.

The positive electrode material is preferably a compound containing lithium. Examples of this compound include a complex oxide composed of lithium and transition metal elements, and a phosphoric acid compound containing lithium and transition metal elements. Among them, a compound containing at least one of nickel, iron, manganese, and cobalt is preferable for the positive electrode material.

The chemical formula of the positive electrode material is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and transition metal elements include a lithium cobalt complex oxide ($Li_xCoO_2$) and a lithium nickel complex oxide ($Li_{x^-}NiO_2$). Examples of the phosphoric acid compound containing lithium and transition metal elements include a lithium iron phosphoric acid compound ($LiFePO_4$), a lithium iron manganese phosphoric acid compound ($LiFe_{1-u}Mn_uPO_4$ (0<u<1)). Use of these positive electrode materials enables a higher battery capacity and excellent cycle performance.

[Negative Electrode]

The negative electrode is configured as in the above negative electrode 10 for a lithium-ion secondary battery shown in FIG. 1, and, for example, has the negative electrode active material layer disposed on both faces of the current collector. The negative electrode preferably has a negative-electrode charge capacity larger than a battery charge capacity (electrical capacitance) provided by the positive electrode active material. This negative electrode itself can inhibit the precipitation of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

The above area at which the positive and negative electrode active material layers do not face one another is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

At least a part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran. Among these, ethylene carbonate, propylene carbonate, dimethyl carbonate, diethyl carbonate, ethylmethyl carbonate, or the combination thereof is preferable. Such solvent enables better performances.

The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

For an alloyed negative electrode, the solvent preferably contains at least one of a halogenated chain carbonic acid ester and a halogenated cyclic carbonic acid ester.

Such a solvent enables the negative electrode active material to be coated with a stable coating at discharging and particularly charging.

The halogenated chain carbonic acid ester is a chain carbonic acid ester containing halogen, in which at least one hydrogen atom is substituted with halogen. The halogenated cyclic carbonic acid ester is a cyclic carbonic acid ester containing halogen, in which at least one hydrogen atom is substituted with halogen.

The halogen is preferably, but not particularly limited to, fluorine, for fluorine enables the formation of better coating than other halogens do. A larger number of halogens is better, for a more stable coating can be obtained, thus reducing the decomposition reaction of an electrolyte.

Examples of the halogenated chain carbonic acid ester include carbonic acid fluoromethylmethyl ester and carbonic acid methyl(difluoromethyi) ester. Examples of the halogenated cyclic carbonic acid ester include 4-fluoro-1,3-dioxolan-2-one and 4,5-difluoro-1,3-dioxolan-2-one.

The solvent preferably contains an unsaturated carbon bond cyclic carbonate as an additive, for this enables the formation of a stable coating on a negative electrode at charging and discharging and the inhibition of the decomposition reaction of an electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably in the range from 0.5 mol/kg to 2.5 mol/kg. This content enables high ionic conductivity.

[Manufacture of Laminate Film Secondary Battery]

Firstly, a positive electrode is produced with the above positive electrode material in the following manner.

A positive-electrode mixture is created by mixing the positive electrode active material with as necessary the binder, the conductive additive, and other materials, and dispersed in an organic solvent to form slurry of the positive-electrode mixture.

This slurry is then applied to a positive electrode current collector with a coating apparatus such as a die coater having a knife roll or a die head, and dried by hot air to obtain a positive electrode active material layer.

The positive electrode active material layer is finally compressed with, for example, a roll press. The compression may be performed under heating. The compression may be repeated multiple times.

Secondly, a negative electrode active material layer is formed on a negative electrode current collector to produce a negative electrode through the same procedure as in the above production of the negative electrode 10 for a lithium-ion secondary battery.

The positive electrode and the negative electrode are produced in the same manner as above. When these electrodes are produced, the active material layers are formed on both faces of the positive and negative electrode current collectors. In both the electrodes, the length of these active material layers formed on the faces may differ from one another (See FIG. 1).

Then, an electrolyte is prepared. With ultrasonic welding, the positive electrode lead 32 is attached to the positive electrode current collector and the negative-electrode lead 33 is attached to the negative electrode current collector.

The positive and negative electrodes and the separator interposed therebetween are stacked or wound to produce the electrode body 31 and a protecting tape is stuck to the outermost circumference of the body. The electrode body is flattened.

The film-shaped outer part is folded in half to interpose the electrode body therebetween. Insulating portions of the outer part 35 are stuck to one another by heat sealing such that one of the four sides is opened to house the electrode body. The close adhesion films are inserted between the outer part and the positive and negative electrode leads.

The prepared electrolyte is introduced from the open side in a prescribed amount to perform the impregnation of the electrolyte under a vacuum. The open side is stuck by vacuum heat sealing.

In this manner, the laminate film secondary battery 30 can be produced.

EXAMPLE

The present invention will be more specifically described below with reference to examples and comparative examples, but the present invention is not restricted to these examples.

Examples 1-1 to 1-5 and Comparative Examples 1-1 to 1-5

A laminate film lithium-ion secondary battery 30 shown in FIG. 3 was produced by the following procedure.

The procedure began with the production of a positive electrode. Positive electrode active materials of 95 mass % of lithium cobalt complex oxide $LiCoO_2$, 2.5 mass % of positive electrode conductive additive, and 2.5 mass % of positive electrode binders (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both faces of a positive electrode current collector with a coating apparatus having a die head and dried with a drying apparatus of hot-air type. The positive electrode current collector had a thickness of 15 μm. The resultant was finally compressed with a roll press.

Next, a negative electrode was produced. For the production of a negative electrode active material, a mixed raw material of metallic silicon and silicon dioxide was placed in a reactor and heated at 1400° C. under a vacuum of 10 Pa to deposit the material. The deposit was sufficiently cooled and then taken out to pulverize the deposit with a ball mill. The silicon-based material was thus produced.

After adjusting the particle size of the silicon-based material, this powder material was subjected to thermal CVD, as needed, to form a carbon layer. The produced powder was bulk-modified by an electrochemical method in a mixed solvent having a propylene-carbonate:ethylene-carbonate:dimethyl-carbonate ratio of 1:1:1, including 1.3 mol/kg of electrolyte salt.

The obtained negative electrode active material particles were dried, as needed, under a carbon dioxide atmosphere. The negative electrode active material particles were then mixed with a precursor of negative electrode binder, a first conductive additive, and a second conductive additive at a dry-weight ratio of 80:8:10:2. The mixture was diluted with water to form paste slurry of a negative-electrode mixture. For this mixture, polyacrylic acid having a molecular weight of 1,000,000 was used.

The negative-electrode mixture slurry was then applied to both faces of a negative electrode current collector with a coating apparatus and dried. The negative electrode current collector used was an electrolytic copper foil, having a thickness of 15 μm.

The resultant current collector was finally dried under a vacuum at 90° C. for 3 hours.

Then, a solvent was produced by mixing 4-fluoro-1,3-dioxolan-2-one (FEC), ethylene carbonate (EC), and dimethyl carbonate (DMC). An electrolyte salt (lithium hexafluorophosphate, $LiPF_6$) was dissolved therein to produce an electrolyte. The composite of the solvent was FEC:EC:DMC=10:20:70 in term of the volume. The content of the electrolyte salt in the solvent was 1.2 mol/kg.

The secondary battery was assembled by the following procedure.

An aluminum lead was first ultrasonic-welded to one end of the positive electrode current collector. A nickel lead was welded to one end of the negative electrode current collector.

The positive electrode, a separator, the negative electrode, a separator were then stacked in this order and wound in a longitudinal direction to obtain a wound electrode body. The end of the wound part was fixed by a PET protecting tape. The separators were a 12-μm laminate film composed of a porous polyethylene film interposed between porous polypropylene films.

The electrode body was interposed between outer parts and the outer circumferences except one side were heat-sealed to house the electrode body therein. The outer parts were an aluminum laminate film composed of a nylon film, aluminum foil, and a polypropylene film stacked.

The prepared electrolyte was poured from an open side to perform the impregnation of the electrolyte under a vacuum. The open side was stuck by heat sealing.

In examples 1-1 to 1-5 and comparative examples 1-1 to 1-5, x-value of $SiO_x$ was changed in the range of 0.3 to 1.8 while the ratio A/B was fixed at 2, where A is a peak intensity of an Si region represented by a chemical shift value of −60 ppm to −100 ppm and B is a peak intensity of an $SiO_2$ region represented by a chemical shift value of −100 ppm to −150 ppm that are obtained from a $^{29}$Si-MAS-NMR spectrum. The amount of accumulated oxygen in the bulk (x-value of $SiO_x$) was adjusted by changing the temperature and the ratio of raw materials to be vaporized.

Moreover, conditions for inserting and extracting lithium were changed in the electrochemical method to control the substances to be produced so that $Li_6Si_2O_7$, $Li_2Si_3O_5$, and $Li_4$ were produced in the bulk.

The negative electrode active material used for producing the negative electrode contained polytetrafluoroethylene, polyhexafluoropropylene, and polyperfluorokerosene on its surface layer and $SiO_2$ having a tridymite structure, except for the negative electrode active material used in comparative examples 1-2 to 1-4, which contained none of polytetrafluoroethylene, polyhexafluoropropylene, and polyperfluorokerosene on its surface layer. The $SiO_2$ having a tridymite structure was formed by controlling temperature of a deposited plate for a $SiO_x$ material, rate, and reaction temperature when the carbon layer was deposited.

Moreover, in examples 1-1 to 1-5, comparative examples 1-1, 1-3, and 1-5, the surface layer of the negative electrode active material was dip-coated with bis(trifluoromethyl)dicarbonate. Whether the coating bis(trifluoromethyl)dicarbonate was crystalized was examined by XRD. Then, the capacity retention rate and the initial efficiency were investigated. In comparative example 1-3, the peak of bis(trifluoromethyl)dicarbonate, which has been applied by dip-coating on the negative electrode active material, was not detected by XRD, so that it was judged that bis(trifluoromethyl)dicarbonate failed to stick and crystalize.

These active materials utilize lithium to reduce a Li-reacting site and thus require a measure against gelation and water resistance for a subsequent battery evaluation. The surface layer was therefore dip-coated with bis(trifluoromethyl)dicarbonate so as to be adaptable for both slurry of a solvent type and an aqueous type. Whether the fluorine compound is crystalized depends on a powder separation method after dipping. To improve the water resistance and inhibit the gelation, the fluorine compound is desirably crystalized.

On the other hand, the negative electrode active materials used in comparative examples 1-2 and 1-4 contained neither the crystalized fluorine compound nor the compound containing $—CF_2—CF_2—$ units in at least a part of the surface layer.

Furthermore, the surface layer portion of the silicon-based material exhibited $O_2SiF^-$ and $OSiF^-$ when subjected to TOF-SIMS, and the surface layer portion contained carbon, lithium carbonate, and fluorinated lithium.

The negative electrode active material particles had a median size of 4 μm. The negative electrode active material exhibited a diffraction peak having a half width (2θ) of 2.59°, attributable to an (111) crystal face and obtainable by X-ray diffraction. The crystallite size attributable to the Si(111) crystal face of the negative electrode active material was 3.2 nm.

The cycle performance and the first charge and discharge performance of the secondary batteries in examples 1-1 to 1-5 and comparative examples 1-1 to 1-5 were investigated.

The cycle performance was investigated in, the following manner.

First, two cycles of charging and discharging were performed at 25° C. to stabilize the battery, and the discharge capacity in the second cycle was measured.

Next, the cycle of charging and discharging was repeated until the total number of cycles reached 100 cycles and the discharge capacity was measured every cycle.

Finally, capacity retention rate was calculated by dividing the discharge capacity in the 100-th cycle by the discharge capacity in the second cycle.

The cycle conditions were as follows: The secondary batteries were charged at a constant current density of 2.5 $mA/cm^2$ until the voltage reached 4.3 V. After this voltage reached 4.3 V, the charging was continued while the current density became 0.25 $mA/cm^2$ at a constant voltage of 4.3 V. The batteries were then discharged at a constant current density of 2.5 $mA/cm^2$ until the voltage reached 2.8 V.

The first charge and discharge performance was calculated by the following expression:

Initial Efficiency (%)=(First Discharge Capacity/First Charge Capacity)×100

The atmosphere and the temperature were the same as the cycle performance was investigated. The charging and discharging conditions were 0.2 times the conditions of the investigation of the cycle performance. More specifically, the secondary batteries were charged at a constant current density of 0.5 $mA/cm^2$ until the voltage reached 4.3 V. After this voltage reached 4.3 V, the charging was continued while the current density became 0.05 $mA/cm^2$ at a constant voltage of 4.3 V. The batteries were then discharged at a constant current density of 0.5 $mA/cm^2$ until the voltage of the battery reached 2.8 V.

The results of examples 1-1 to 1-5 and comparative examples 1-1 to 1-5 are given in Table 1.

TABLE 1

|  | SiOx (X=) | Crystallization of bis(trifluoromethyl) dicarbonate | bis(trifluoromethyl) dicarbonate | Initial efficiency (%) | Capacity retention rate (%) |
| --- | --- | --- | --- | --- | --- |
| Comparative example 1-1 | 0.3 | Yes | Present | 67 | 81.5 |
| Example 1-1 | 0.5 | Yes | Present | 75 | 81.0 |
| Example 1-2 | 0.7 | Yes | Present | 80 | 80.5 |
| Example 1-3 | 1 | Yes | Present | 82 | 80.0 |
| Comparative example 1-2 | 1 | No | Absent | 70 | 68.0 |
| Comparative example 1-3 | 1 | No (peak was not detected) | Present | 72 | 70.0 |

TABLE 1-continued

|  | SiOx (X=) | Crystallization of bis(trifluoromethyl) dicarbonate | bis(trifluoromethyl) dicarbonate | Initial efficiency (%) | Capacity retention rate (%) |
|---|---|---|---|---|---|
| Comparative example 1-4 | 1 | No | Absent | 75 | 78.0 |
| Example 1-4 | 1.2 | Yes | Present | 82 | 80.0 |
| Example 1-5 | 1.6 | Yes | Present | 81 | 80.0 |
| Comparative example 1-5 | 1.8 | Yes | Present | — | — |

As shown in Table 1, when the oxygen amount was lack (x=0.3), i.e., when the x-value of $SiO_x$ was less than 0.5, the initial efficiency significantly degraded. When the oxygen amount was excess (x=1.8), i.e., when the x-value of $SiO_x$ was more than 1.6, the conductivity decreased, and the capacity of the SiO material was not exhibited according to design. Thus, the evaluation was stopped.

Examples 2-1 to 2-3 and Comparative Example 2-1

A secondary battery was produced as in example 1-3 except the following. The conditions for inserting and extracting lithium were changed in the electrochemical method to control and change the substances to be produced in the bulk. The x-value of $SiO_x$ was fixed at x=1. Comparative example 2-1 did not contain any lithium compounds of $Li_6Si_2O_7$, $Li_2Si_3O_5$, and $Li_4SiO_4$.

Moreover, the conditions of the contained substances were changed by adjusting a gas atmosphere after production and then drying by heat to obtain a more stable material.

For example, $Li_4SiO_4$ changes into $Li_2SiO_3$ and $Li_2CO_3$ by applying heat under a carbon dioxide atmosphere. The reaction like this was used to achieve the best bulk condition and improve the retention rate and the initial efficiency.

The obtained lithium compound can be detected by XPS. For example, $Li_4SiO_4$ and $Li_2SiO_3$ can be detected by a binding energy around 532 eV and a binding energy around 530 eV, respectively. The compound also can be detected by a $^{29}$Si-MAS-NMR spectrum.

The lithium compound to be produced is preferably substantially amorphous, for the amorphous compound hardly increases the resistance of the negative electrode active material.

The degree of crystallinity can be controlled by a heat treatment under a non-atmospheric condition after insertion and extraction of lithium.

Hereinafter, examinations were conducted with the lithium compound in the bulk being amorphous.

The cycle performance and the first charge and discharge performance of the secondary batteries were investigated as in example 1-3. The results of examples 2-1 to 2-3 and comparative example 2-1 are given in Table 2.

TABLE 2

|  | Lithium compound | Capacity retention rate (%) | Initial efficiency (%) |
|---|---|---|---|
| Example 1-3 | $Li_6Si_2O_7$, $Li_2Si_3O_5$, $Li_4SiO_4$ | 82 | 80.0 |
| Example 2-1 | $Li_6Si_2O_7$, $Li_4SiO_4$ | 81 | 80.0 |
| Example 2-2 | $Li_2Si_3O_5$, $Li_4SiO_4$ | 81 | 80.0 |
| Example 2-3 | $Li_4SiO_4$ | 80 | 80.0 |
| Comparative example 2-1 | — | 75 | 67.0 |

As shown in Table 2, when none of $Li_6Si_2O_7$, $Li_2Si_3O_5$, and $Li_4SiO_4$ were contained in the bulk, both the capacity retention rate and the initial efficiency significantly degraded.

Examples 3-1 to 3-5

A secondary battery was produced as in example 1-3 except to change the ratio A/B, where A is a peak intensity of an Si region represented by a chemical shift value of −60 ppm to −100 ppm and B is a peak intensity of an $SiO_2$ region represented by a chemical shift value of −100 ppm to −150 ppm that were obtained from a $^{29}$Si-MAS-NMR spectrum. The ratio A/B was changed by adjusting the ratio between Si components and $SiO_2$ components produced in the bulk.

The cycle performance and the first charge and discharge performance of the secondary batteries were investigated as in example 1-3. The results of examples 3-1 to 3-5 are given in Table 3.

TABLE 3

|  | A(Si)/B($SiO_2$) | Capacity retention rate (%) | Initial efficiency (%) |
|---|---|---|---|
| Example 3-1 | 0.4 | 81 | 70.0 |
| Example 3-2 | 0.8 | 82 | 73.0 |
| Example 1-3 | 2 | 82 | 80.0 |
| Example 3-3 | 1 | 82 | 80.0 |
| Example 3-4 | 2.5 | 83 | 90.0 |
| Example 3-5 | 3 | 84 | 95.0 |

As shown in Table 3, when the peak intensity B of the $SiO_2$ region of the chemical shift value obtained from the $^{29}$Si-MAS-NMR spectrum was small, namely when A/B was 0.8 or more, high battery performances were obtained. This indicates that the initial efficiency of the battery can be improved by previously reducing the $SiO_2$ portion, which is a Li-reacting site, as well as the battery degradation with charging and discharging can be inhibited by the stable lithium compound in the bulk or on the surface.

Examples 4-1 to 4-9

A secondary battery was produced as in example 1-3 except that the half width (2θ) of the diffraction peak attributable to an Si(111) crystal face and obtained by X-ray diffraction of the negative electrode active material and the Si(111) crystallite size of the negative electrode active material were changed as shown in Table 4.

The cycle performance and the first charge and discharge performance of the secondary batteries were investigated as in example 1-3. The results of examples 4-1 to 4-9 are given in Table 4.

TABLE 4

|  | Half width (2θ) | Si(111) crystallite size (nm) | Capacity retention rate (%) | Initial efficiency (%) |
|---|---|---|---|---|
| Example 4-1 | 0.756 | 11.42 | 71 | 81.0 |
| Example 4-2 | 0.796 | 10.84 | 72 | 81.0 |
| Example 4-3 | 1.025 | 8.55 | 74 | 80.5 |
| Example 4-4 | 1.218 | 7.21 | 80 | 80.5 |
| Example 4-5 | 1.271 | 6.63 | 81 | 80.0 |
| Example 4-6 | 1.845 | 4.62 | 81 | 80.0 |
| Example 4-7 | 2.257 | 3.77 | 82 | 80.0 |
| Example 1-3 | 2.593 | 3.29 | 82 | 80.0 |
| Example 4-8 | 10.123 | 1.524 | 83 | 80.0 |
| Example 4-9 | 20.221 | 0 | 84 | 80.0 |

When the crystallinity of the negative electrode active material was change, as shown in Table 4, the capacity retention rate and the initial efficiency changed in response to the variation in the crystallinity.

In particular, high capacity retention rate and high initial efficiency were obtained by low crystallinity materials with a half width (2θ) of 1.2° or more and a crystallite size of 7.5 nm or less, which is attributable to an Si(111) crystal face. The best battery performances were obtained when the material was amorphous. Although example 4-9 exhibited a half width of 20° or more, this value was obtained by fitting with analysis software because the peak value was not obtained. The silicon-based active material in example 4-9 was substantially amorphous.

Examples 5-1 to 5-3

A secondary battery was produced as in example 1-3 except that the combination of the fluorine compound containing —$CF_2$—$CF_2$— units, applied by dip-coating to the negative electrode active material, was changed. The fluorine compound was selected from the following three compounds, polytetrafluoroethylene, polyhexafluoropropylene, and polyperfluorokerosene.

The cycle performance and the first charge and discharge performance of the secondary batteries were investigated as in example 1-3. The results of examples 5-1 to 5-3 are given in Table 5.

TABLE 5

|  | Coating fluorine compound | Capacity retention rate (%) | Initial efficiency (%) |
|---|---|---|---|
| Example 1-3 | polytetrafluoroethylene, polyhexafluoropropylene, polyperfluorokerosene | 82.0 | 80.0 |
| Example 5-1 | polytetrafluoroethylene, polyhexafluoropropylene | 82.0 | 77.0 |
| Example 5-2 | polytetrafluoroethylene, polyperfluorokerosene | 82.0 | 76.0 |
| Example 5-3 | polytetrafluoroethylene | 82.0 | 75.0 |

As shown in Table 5, high capacity rate and high initial efficiency were obtained by selecting the fluorine compound containing —$CF_2$—$CF_2$— units from three of polytetrafluoroethylene, polyhexafluoropropylene, and polyperfluorokerosene.

The reason is supposed as follows. These compounds previously reduced the $SiO_2$ portion, which is a Li-reacting site, thereby improving the battery initial efficiency. In addition, this allowed the stable lithium compound to be in the bulk or on the surface, enabling inhibition of the battery degradation with charging and discharging.

Examples 6-1 to 6-5

A secondary battery was produced as in example 1-3 except that a carbon-based active material was contained in the negative electrode of the laminate film lithium-ion secondary battery 30 such that the proportion of silicon-based active material in the whole negative electrode active materials varied as shown in Table 6. In these examples, the silicon-based active material had SiO (x=1) as in examples 2-1 to 2-3.

The carbon-based active material used in the negative electrode had a natural-graphite-to-synthetic-graphite ratio of 50:50.

Then, the increase rate of the capacity of the secondary batteries in examples 6-1 to 6-5 was investigated. The results of examples 6-1 to 6-5 are given in Table 6.

TABLE 6

|  | Silicon-based active material content (wt %) | Increase rate of battery capacity (Wh %) |
|---|---|---|
| Example 6-1 | 10 | 7.912 |
| Example 6-2 | 20 | 14.784 |
| Example 6-3 | 30 | 18.952 |
| Example 6-4 | 40 | 21.560 |
| Example 6-5 | 50 | 23.744 |
| Example 1-3 | 100 | 26.248 |

The increase rate (Wh %) of the battery capacity shown in Table 6 was calculated on the basis of a battery capacity when the content of the silicon-based active material was 0 wt %. As the content of the silicon-based active material increased, the effect of the carbon material on the SiO discharge potential decreased, and thus the battery capacity increased.

Natural graphite contained in the negative electrode serves as a buffer of the silicon-based active material, which is expandable and contractible repeatedly. Synthetic graphite enables high cycle retention rate.

Figure 6:
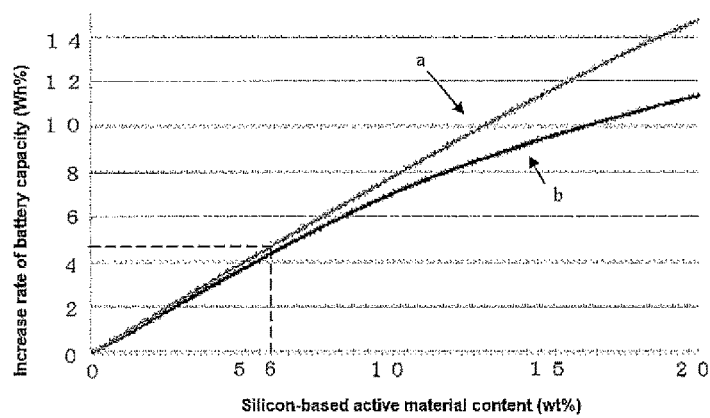
FIG. 6 is a diagram showing an increase rate of the battery capacity when the content of the silicon-based active material is increased in the negative electrode active material.

The graph of FIG. 6 shows the relationship between the content of the silicon-based active material with respect to the whole negative electrode active materials and the increase rate of the battery capacity of the secondary battery.

Curve a in FIG. 6 shows an increase rate of the battery capacity when the content of the silicon-based active material was increased in the negative electrode active materials of the present invention. Curve b in FIG. 6 shows an increase rate of the battery capacity when the content of a silicon-based active material that was not doped with lithium was increased.

As shown in FIG. 6, the increase rate of the battery capacity of curve a was larger than that of curve b, especially within the range where the content of the silicon-based active material is 6 wt % or more. The difference therebetween increased with the increase of the content of the silicon-based active material. These results of Table 6 and FIG. 6 indicate that the inventive battery in which the negative electrode active materials contain the silicon-based active material in an amount of 6 wt % or more had a larger increase rate of the battery capacity than conventional one, and thus the volume energy density of the negative electrode active materials significantly increased especially within the above content range.

Example 7-1

A secondary battery was produced as in example 1-3 except that the surface layer portion of the silicon-based material did not exhibit $O_2SiF^-$ and $OSiF^-$ when subjected to TOF-SIMS.

The cycle performance and the first charge and discharge performance of the secondary batteries were investigated as in example 1-3. The result of example 7-1 is given in Table 7.

TABLE 7

| | TOF-SIMS | Capacity retention rate (%) | Initial efficiency (%) |
|---|---|---|---|
| Example 1-3 | $O_2SiF^-$, $OSiF^-$ | 82 | 80.0 |
| Example 7-1 | — | 79 | 80.0 |

As shown in Table 7, when $O_2SiF^-$ and $OSiF^-$ were detected in a negative ion mass spectrum of the surface layer portion of the silicon-based material, the reaction of the electrolyte was inhibited, resulting in improvement in the battery retention rate.

Examples 8-1 to 8-3

A secondary battery was produced as in example 1-3 except that the combination of the substance coating the surface layer of the silicon-based material in the negative electrode active material was changed as shown in Table 8. The coating layer was selected from the following three substances, carbon, a fluorine compound, and lithium carbonate, by controlling voltage and current along with the formation of the lithium compound or keeping in a solvent under heating.

The cycle performance and the first charge and discharge performance of the secondary batteries were investigated as in example 1-3. The results of examples 8-1 to 8-3 are given in Table 8.

TABLE 8

| | Negative electrode active material surface | Capacity retention rate (%) | Initial efficiency (%) |
|---|---|---|---|
| Example 1-3 | carbon, lithium carbonate, fluorinated lithium | 82.0 | 80.0 |
| Example 8-1 | carbon, fluorinated lithium | 81.0 | 79.0 |
| Example 8-2 | carbon, lithium carbonate, | 81.0 | 78.0 |
| Example 8-3 | carbon | 80.0 | 77.0 |

As shown in Table 8, the negative electrode active material coated with at least one of carbon, a fluorine compound, and lithium carbonate exhibited high initial efficiency. The more the coating substances selected from three of carbon, a fluorine compound, and lithium carbonate, the better the initial efficiency.

Example 9-1

A secondary battery was produced as in example 1-3 except that $SiO_2$ having a tridymite structure was not formed in the bulk.

The cycle performance and the first charge and discharge performance of the secondary battery was investigated as in example 1-3. The result of example 9-1 is given in Table 9.

TABLE 9

| | Tridymite structure | Capacity retention rate (%) | Initial efficiency (%) |
|---|---|---|---|
| Example 1-3 | Yes | 82.0 | 80.0 |
| Example 9-1 | No | 77.0 | 80.0 |

As shown in Table 9, the battery having a tridymite structure improved the capacity retention rate. The reason is supposed that formation of the tridymite structure inhibited breakage of the active material at charging and discharging.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material for a negative electrode material of a non-aqueous electrolyte secondary battery, comprising a silicon-based material expressed by $SiO_x$ where $0.5 \leq x \leq 1.6$ and a crystalized fluorine compound in at least a part of a surface layer of the negative electrode active material, the silicon-based material containing at least one of $Li_6Si_2O_7$, $Li_2Si_3O_5$, $Li_4SiO_4$, and $Li_2SiO_3$, wherein the crystalized fluorine compound is bis(trifluoromethyl) dicarbonate.

2. The negative electrode active material according to claim 1, wherein the negative electrode active material at least partially contains $SiO_2$ having a tridymite structure.

3. The negative electrode active material according to claim 1, wherein a surface layer portion of the silicon-based material is coated with at least one of carbon, lithium carbonate, and fluorinated lithium.

4. The negative electrode active material according to claim 1, wherein a surface layer portion of the silicon-based material exhibits at least one of $O_2SiF^-$ and $OSiF^-$ when subjected to Time-of-Flight Secondary Ion Mass Spectrometry.

5. The negative electrode active material according to claim 1, wherein a surface layer of the silicon-based material has a layered structure in which the silicon-based material is coated with a carbon-based material, at least one of lithium carbonate and fluorinated lithium, and bis(trifluoromethyl) dicarbonate in this order.

6. The negative electrode active material according to claim 1, wherein the negative electrode active material satisfies $A/B \geq 0.8$ where A is a peak intensity of an Si region represented by a chemical shift value of −60 ppm to −100 ppm and B is a peak intensity of an $SiO_2$ region represented by a chemical shift value of −100 ppm to −150 ppm, the chemical shift value being obtained from a $^{29}$Si-MAS-NMR spectrum.

7. The negative electrode active material according to claim 1, wherein the negative electrode active material exhibits a diffraction peak having a half width (2θ) of 1.2° or more, the diffraction peak being attributable to an Si(111) crystal face and obtained by X-ray diffraction, and a crystallite size attributable to the Si(111) crystal face is 7.5 nm or less.

8. The negative electrode active material according to claim 1, further comprising at least one fluorine compound containing —$CF_2$—$CF_2$— units and selected from the group consisting of polytetrafluoroethylene, polyhexafluoropropylene, and polyperfluorokerosene, in at least a part of a surface layer of the negative electrode active material.

9. A negative electrode for a non-aqueous electrolyte secondary battery, comprising a negative electrode active material according to claim 1.

10. The negative electrode for a non-aqueous electrolyte secondary battery according to claim 9, wherein the negative electrode comprises a carbon-based active material and the silicon-based material with a silicon-based material content of 6 wt % or more with respect to whole negative electrode active materials.

11. A non-aqueous electrolyte secondary battery comprising a negative electrode for a non-aqueous electrolyte secondary battery according to claim 9.

* * * * *